(12) United States Patent
Saito

(10) Patent No.: US 8,897,107 B2
(45) Date of Patent: Nov. 25, 2014

(54) PLAYBACK DEVICE AND PLAYBACK METHOD

(71) Applicant: Sony Corporation, Tokyo (JP)

(72) Inventor: Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/077,291

(22) Filed: Nov. 12, 2013

(65) Prior Publication Data

US 2014/0140185 A1   May 22, 2014

(30) Foreign Application Priority Data

Nov. 20, 2012 (JP) ................................. 2012-254376

(51) Int. Cl.
*G11B 7/00* (2006.01)
*G11B 7/1372* (2012.01)

(52) U.S. Cl.
CPC .................................. *G11B 7/1372* (2013.01)
USPC ................... 369/44.24; 369/112.05; 369/118; 369/275.4

(58) Field of Classification Search
None
See application file for complete search history.

(56) References Cited

FOREIGN PATENT DOCUMENTS

JP     2002-269776 A     9/2002

OTHER PUBLICATIONS

Miyagawa, N. et al., "Land and Groove Recording for High Track Density on Phase-Change Optical Disks," Jpn. J. Appl. Phys., Nov. 1993, pp. 5324-5328, vol. 32.

*Primary Examiner* — Wayne Young
*Assistant Examiner* — Brian Butcher
(74) *Attorney, Agent, or Firm* — Sony Corporation

(57) ABSTRACT

There is provided a playback device including a light source, an objective lens that radiates light emitted onto an optical recording medium, and onto which is incident reflected light obtained from a recording surface of the optical recording medium, a condenser lens that condenses the reflected light, a photodetecting section configured to, provided that a confocal position is a focal position of the condenser lens, $\lambda$ is a wavelength of light radiated onto the optical recording medium, and NA is a numerical aperture of the objective lens, extract and detect light within a range of a diameter less than $1.5\lambda/NA$ centered on an optical axis at the confocal position, and a phase difference imparting section that imparts a designated phase difference between a reflected light component from a readout track and a reflected light component from a track neighboring the readout track.

11 Claims, 15 Drawing Sheets

FIG. 5
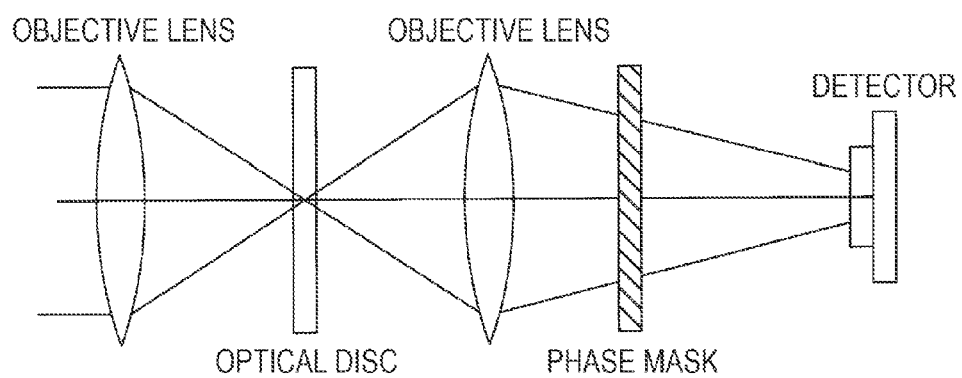
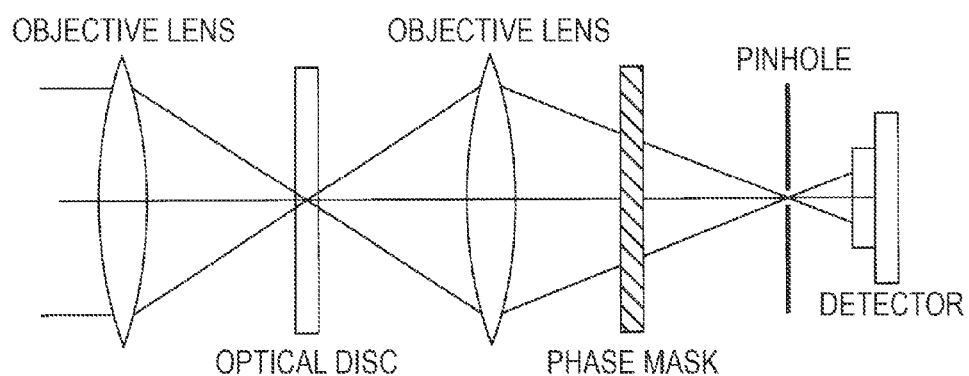

PLAYBACK DEVICE AND PLAYBACK METHOD

CROSS REFERENCE TO RELATED APPLICATIONS

This application claims the benefit of Japanese Priority Patent Application JP 2012-254376 filed Nov. 20, 2012, the entire contents of which are incorporated herein by reference.

BACKGROUND

The present technology relates to a playback device and method for playing back information recorded on an optical recording medium, and more particularly, relates to technology that reduces the effects of crosstalk from a neighboring track.

Optical recording media in which information is recorded or played back by light irradiation, such as the Compact Disc (CD), Digital Versatile Disc (DVD), and Blu-ray Disc (BD; registered trademark), for example, are widely prevalent.

Even with these optical recording media, there is demand for increased recording capacity as recording media, and for this reason techniques such as making the track pitch narrower have been adopted.

However, making the track pitch narrower leads to the problem of crosstalk from information recorded on a neighboring track.

Among technologies that attempt to reduce crosstalk for an optical recording medium, or in other words improve the signal to noise ratio (S/N) for the readout signal of a target track, there exists technology that sets the groove depth to $\lambda/6$, as described in Japanese Unexamined Patent Application Publication No. 2002-269776 and in "Land and Groove Recording for High Track Density on Phase-Change Optical Disks," Naoyasu Miyagawa, Yasuhiro Gotoh, Eiji Ohno, Kenichi Nishiuchi and Nobuo Akahira, Jpn. J. Appl. Phys. Vol. 32 (1993), pp. 5324-5328, Part 1, No. 11B, November 1993. Note that $\lambda$ means the recording/playback wavelength.

Particularly, Miyagawa et al. disclose technology that records both on grooves set to a depth of $\lambda/6$, and on lands arranged between the grooves. According to such land and groove recording technology with the groove depth set to $\lambda/6$, it is possible to reduce crosstalk from a neighboring track (that is, a neighboring land in the case of reading out from a groove, and a neighboring groove in the case of reading out from a land).

Alternatively, for crosstalk reduction, there is also proposed technology that stores the readout signal of a neighboring track, which is used to perform signal processing to cancel crosstalk for the readout signal of the readout track.

SUMMARY

However, the former technique of crosstalk reduction by groove depth is problematic in that land/groove discrepancies in the recording/playback characteristics readily occur, since the depth of the groove to form is comparatively deep. Particularly, since it becomes more difficult for light to enter a groove, recording to a groove involves high power compared to recording to a land.

Also, with the former technique, since the groove depth is comparatively deep, release from the stamper during disc formation tends to worsen, which becomes problematic in terms of yield.

Furthermore, the former technique also has a problem in that, since the groove depth is comparatively deep, the reflected light component from the groove more readily leaks into the focus error signal in the astigmatic method, and the S/N of the focus error signal worsens.

Meanwhile, the latter technique that attempts to reduce crosstalk by signal processing involves separately providing a signal processor for crosstalk reduction and the like, leading to a more complex configuration. There is also a problem in that aligning the phase with the readout signal of a neighboring track is extremely difficult.

Also, attempting to simultaneously read out neighboring ($\times 2$) tracks in addition to the readout track in order to improve the playback rate involves forming a total of three beam spots, and furthermore involves a configuration that separately detects reflected light from each of the beam spots, and thus the configuration of the optical system also becomes more complex.

In light of the problems of the related art above like the above, it is desirable to attempt to reduce crosstalk from a neighboring track and enlarge the recording capacity of an optical recording medium.

According to an embodiment of the present disclosure, there is provided a playback device including a light source, an objective lens that radiates light emitted by the light source onto an optical recording medium, and onto which is incident reflected light obtained from a recording surface of the optical recording medium in accordance with the radiated light, a condenser lens, onto which is incident the reflected light obtained via the objective lens, that condenses the reflected light, a photodetecting section configured in a manner that, provided that a confocal position is a focal position of the condenser lens when the light emitted by the light source is focused onto the recording surface by the objective lens, $\lambda$ is a wavelength of light radiated onto the optical recording medium by the objective lens, and NA is a numerical aperture of the objective lens, the photodetecting section extracts and detects light within a range of a diameter less than $1.5\lambda/NA$ centered on an optical axis at the confocal position, the light being central light of the reflected light at the confocal position, and a phase difference imparting section, inserted on a light path from the light source to the photodetecting section, that imparts a designated phase difference between a reflected light component from a readout track and a reflected light component from a track neighboring the readout track from among tracks formed on the recording surface of the optical recording medium.

With the present technology as above, what is called a confocal optical system is implemented, such that for reflected light obtained from a recording surface, light within a range of a diameter less than $1.5\lambda/NA$ centered on the optical axis at the confocal position (central light) is extracted and detected.

Furthermore, on the light path from the light source to the photodetecting section, a phase difference is imparted between the reflected light component from a track to be read out and the reflected light component from a track neighboring the readout track from among tracks formed on the recording surface.

With such a configuration, it becomes possible to impart a phase difference that is similar to the case of forming a groove of desired depth in an optical recording medium, irrespective of the depth of the groove to form on the recording surface. In other words, as a result, it becomes possible to realize crosstalk reduction effects that are similar to the case of forming a groove with a depth of $\lambda/6$ in the related art, even if a groove with a depth of less than $\lambda/6$ is formed, or a groove is not formed.

According to an embodiment of the present technology as above, it is possible to obtain crosstalk reduction effects that are similar to the case of forming a groove with a depth of λ/6 in the related art, even if a groove with a depth of less than λ/6 is formed, or a groove is not formed. Consequently, the problems faced by a technique of the related art that forms a groove with a depth of λ/6 are potentially solved.

Also, according to an embodiment of the present technology, since a reduction in crosstalk may be realized by adding a phase difference imparting section to a confocal optical system, the problems faced by a technique of the related art that attempts to reduce crosstalk by signal processing may also be solved.

BRIEF DESCRIPTION OF THE DRAWINGS

FIG. 5 is a diagram for explaining the importance of a confocal optical system;

DETAILED DESCRIPTION OF THE EMBODIMENT(S)

Figure 1:
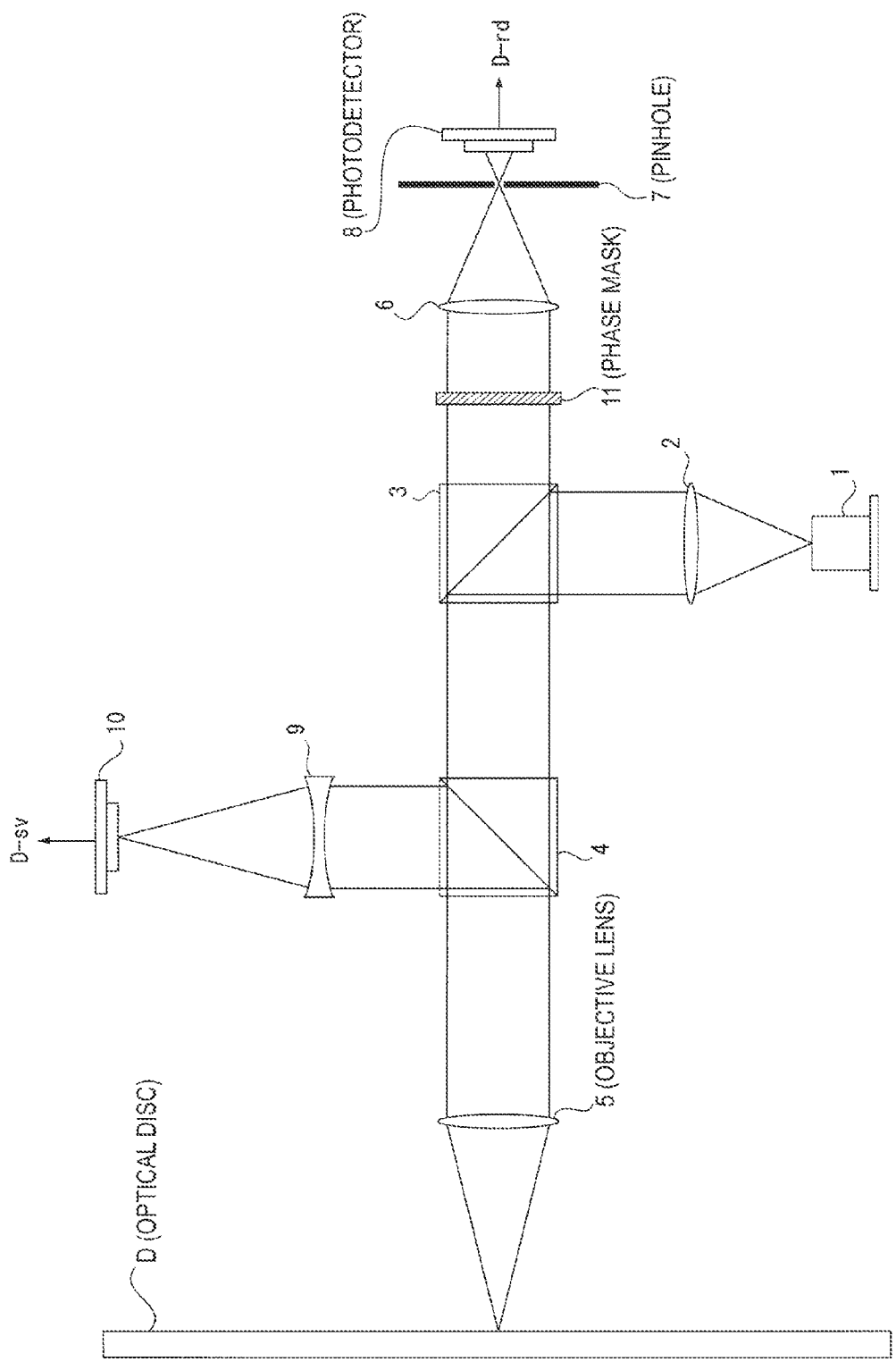
FIG. 1 is an explanatory diagram for a configuration of a playback device according to the first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments according to the present technology will be described. The description will proceed in the following order.

<1. First embodiment>
  [1-1. Configuration of playback device]
  [1-2. Principles]
  [1-3. Extraction area size]
  [1-4. Advantageous effects]
<2. Second embodiment>
<3. Third embodiment>
<4. Exemplary modifications>

1. First Embodiment 1-1. Configuration of Playback Device

FIG. 1 is a diagram for explaining a configuration of a playback device as a first embodiment according to the present technology.

The playback device according to the present embodiment includes a laser 1, a collimating lens 2, a beam splitter 3, a beam splitter 4, an objective lens 5, a condenser lens 6, a pinhole 7, a photodetector 8, a cylindrical lens 9, a photodetector 10, and a phase mask 11, as illustrated in the drawing. The playback device plays back information recorded on the optical disc D in the drawing.

Herein, the optical disc D is a disc-shaped optical recording medium, in which information is recorded and played back by light irradiation. The optical disc D is rotatably driven by a spindle motor (not illustrated) that is provided in the playback device.

Herein, in the first embodiment and the later-discussed second embodiment, grooves acting as guiding channel are presumed to be formed on the recording surface of the optical disc D.

Figure 2:
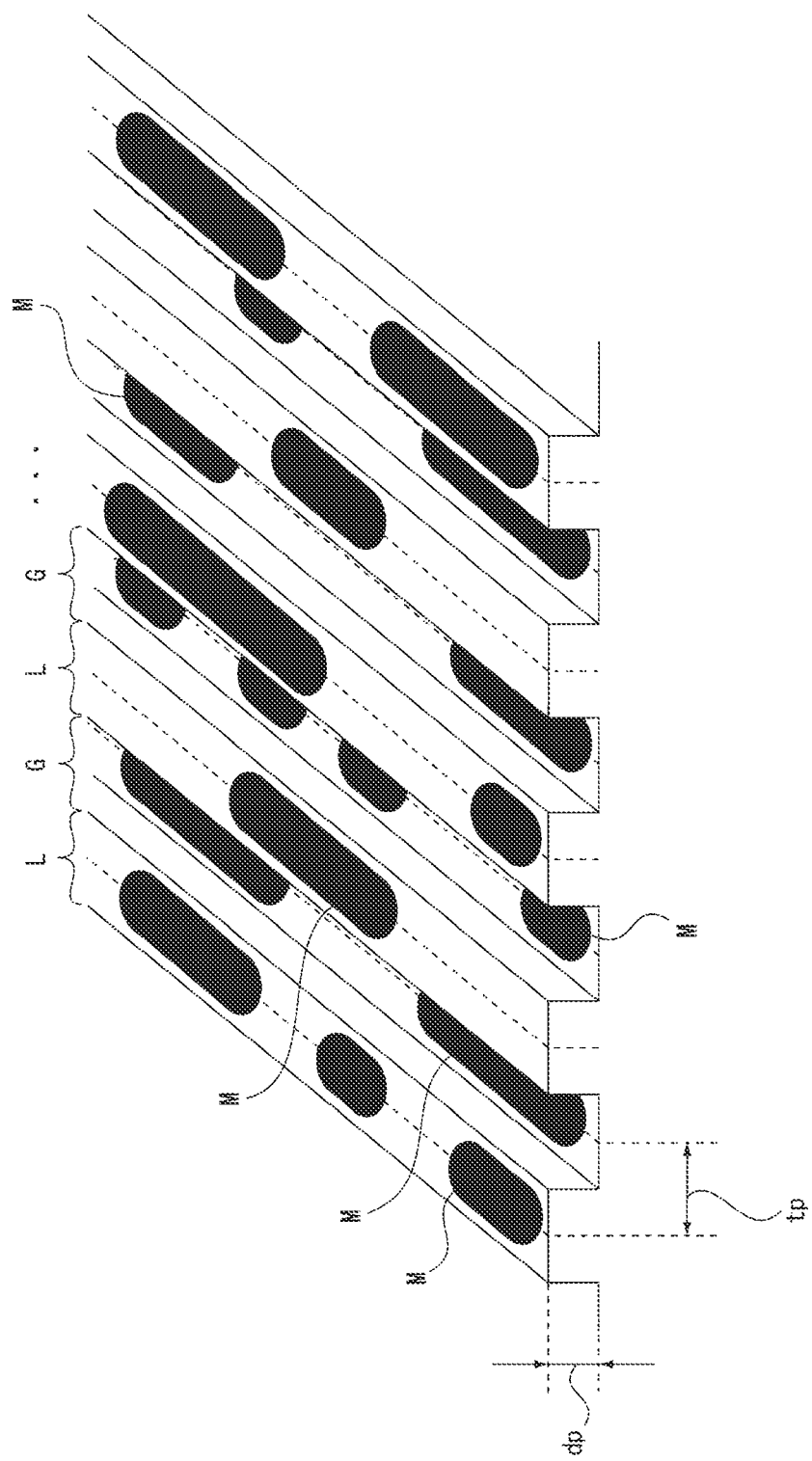
FIG. 2 is a perspective view schematically illustrating the recording surface of an optical disc used in the first (and second) embodiment.

FIG. 2 is a perspective view schematically illustrating the state of the recording surface of an optical disc D.

As illustrated in FIG. 2, grooves G with a depth dp are formed on the recording surface of the optical disc D. In the case of this example, the grooves G are formed in a spiral shape on the recording surface, and as a result, grooves G and lands L are alternately arranged in the radial direction on the recording surface.

Also, on the recording surface, recording marks M are formed on both the grooves G and the lands L, in what is called land and groove recording.

In this case, a recording mark sequence is treated as one track, and consequently the track pitch tp is the spacing between a groove G and a land L, as illustrated in FIG. 2. In other words, the track pitch tp is the pitch between the center of a groove G and the center of a land L.

The description will now return to FIG. 1.

Laser light emitted by the laser 1 is made into parallel light by the collimating lens 2, and then is incident on the beam splitter 3. Part of the laser light incident on the beam splitter 3 is reflected by the splitting face of the beam splitter 3, and is incident on the beam splitter 4, as illustrated in the drawing.

Part of the laser light incident on the beam splitter 4 is transmitted by the splitting face of the beam splitter 4, and radiated onto the optical disc D via the objective lens 5, as illustrated in the drawing.

The objective lens 5 causes the above laser light to be condensed (focused) onto the recording surface of the optical disc D.

As a result of laser light irradiating the recording surface as above, reflected light from the recording surface is obtained, and this reflected light is incident on the beam splitter 4 via the objective lens 5.

At the splitting face of the beam splitter 4, the above reflected light obtained via the objective lens 5 in this way is partially transmitted, and partially reflected.

The reflected light that is reflected by the beam splitter 4 is incident on a photodetecting optical system for generating a servo signal, made up of the cylindrical lens 9 and the photodetector 10 in the drawing. In other words, the reflected light is condensed onto the photodetecting surface of the photodetector 10 via the cylindrical lens 9.

The photodetection signal from the photodetector 10 is designated the photodetection signal D-sv, as in the drawing.

The photodetection signal D-sv is used in order to generate an error signal for controlling respective servos for focus/tracking of the objective lens 5.

Note that, as the use of the cylindrical lens 9 demonstrates, a focus error signal in the case of the present example is generated by the astigmatic method.

The reflected light transmitted by the beam splitter 4 is incident on the beam splitter 3, and partially transmitted through the splitting face of the beam splitter 3.

The above reflected light transmitted by the beam splitter 3 is condensed by the condenser lens 6 after passing through the phase mask 11 as in the drawing.

Herein, in a playback device according to the present embodiment, the optical system is taken to implement what is called a confocal optical system.

In other words, the optical system in this case is configured to extract and detect light in a central part (a central part that includes the optical axis) at a confocal position, which is a focal position of the condenser lens 6 when laser light is focused by the objective lens 5 onto the recording surface of the optical disc D.

Specifically, in this example, a pinhole 7 is disposed with respect to the above confocal position, such that the light in the central part at the above confocal position is extracted by the pinhole 7. Then, the light in the central part extracted in this way is detected by the photodetector 8.

Note that, as illustrated in the drawing, the photodetector 8 in this case enlarges and detects an image extracted by the pinhole 7.

The photodetection signal from the photodetector 8 that is obtained by detecting light in the central part extracted by the pinhole 7 as above is designated the photodetection signal D-rd. The photodetection signal D-rd is used to play back information recorded by recording marks M on the recording surface of the optical disc D. In other words, although omitted from illustration in the drawings, a playback device according to the present embodiment is provided with a playback signal processor that takes the photodetection signal D-rd as input, and plays back the above recorded information (recorded data). The playback signal processor obtains playback data that depends on the recorded data.

Also, although omitted from illustration in the drawings, a playback device according to the present embodiment is provided with an actuator that displaces the objective lens 5 in the tracking direction (the direction parallel to the radial direction of the optical disc D) and the focus direction (the direction going closer to or farther away from the optical disc D), together with a signal generator that generates a tracking error signal and a focus error signal on the basis of a photodetection signal D-sv obtained by the photodetector 10 discussed above, as well as a servo circuit that generates a tracking servo signal and a focus servo signal for servo control from the tracking error signal and the focus error signal, and a driving unit that drives the actuator with a driving signal based on the tracking servo signal and the focus servo signal. Thus, tracking servo control and focus servo control for the objective lens 5 is realized.

1-2. Principles

With the land and groove recording method of the related art with a groove depth of $\lambda/6$ as discussed earlier, crosstalk reduction effects are obtained, or in other words, the effect of improving the signal to noise ratio (S/N) for the readout signal of a target track is obtained. However, the comparatively deep groove depth (dp) leads to various problems.

Accordingly, the present embodiment proposes a technique of obtaining crosstalk reduction effects similar to the related art, but with a shallower depth dp.

The present embodiment implements a technique in which a phase difference imparted by the depth dp of a groove G, that is, the phase difference imparted between the reflected light component of a groove G and the reflected light component of a land L, is also imparted by the phase mask 11 inserted into the optical system.

Figure 3:
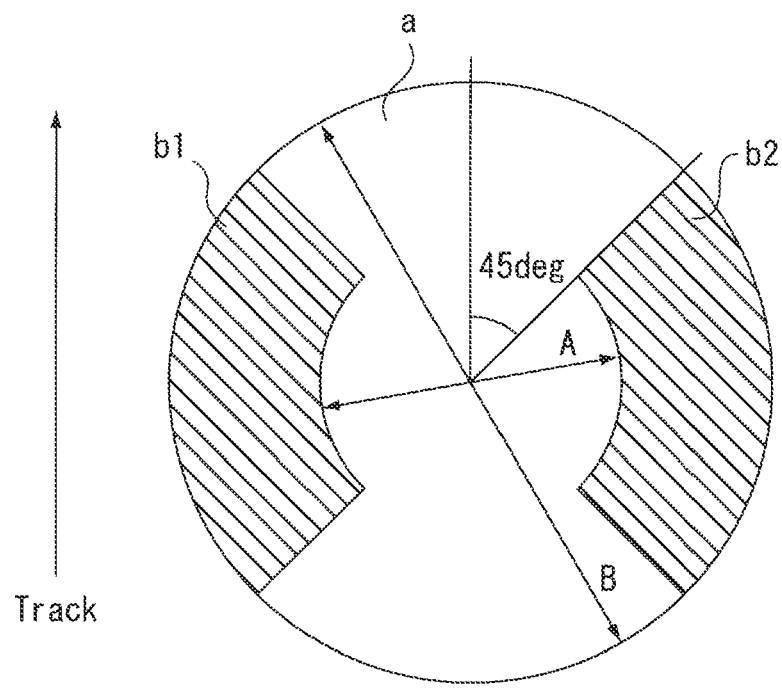
FIG. 3 is a diagram illustrating an example of a phase difference imparting pattern by a phase mask.

FIG. 3 illustrates an example of a phase difference imparting pattern by the phase mask 11.

Note that the arrow labeled "Track" in the drawing represents the direction on the disposed face of the phase mask 11 that corresponds to the direction in which a track (a recording mark sequence) is formed on the recording surface of the optical disc D. When the optical disc D is rotated, the image corresponding to a recording mark M moves in the track direction.

The phase mask 11 is configured to be able to impart, to a beam incident on the phase mask 11, a phase difference between light in an area a, and light in an area b1 and an area b2 of the drawing within the beam.

The purpose of the phase mask 11 in the present embodiment is to impart a suitable phase difference between the reflected light component of a track to be read out (assumed to be on a groove G, for example) and the reflected light component of respective mark sequences neighboring the track to be read out (respective lands L neighboring the readout groove G, for example), which exist within a beam incident on the phase mask 11. For this reason, the above area a is set to a central part of the above beam that includes the optical axis, while the areas b1 and b2 are set to the left and right with the central part therebetween. It should be appreciated that the above "left and right" means to the left and right with reference to the above track direction.

More specifically, in the case of the present example, provided that B is the diameter of the incident beam, the area b2 is set as a fan-shaped area from the angles 45° to 135° with a central angle of 90° within the circular area given by the diameter B, and from which is excluded a fan-shaped area from the angles 45° to 135° with a central angle of 90° within a circular area given by a diameter A centered on the optical axis.

Also, provided that a central axis is an axis passing through the optical axis and parallel to the track direction, the area b1 is set to a position that is bilaterally symmetric to the area b2 about the central axis.

The area a is the portion obtained by excluding these areas b1 and b2 from the circular area of diameter B.

Herein, A<B, and specifically in this example, A/B=41%.

The phase mask 11 in this example is a grating (diffraction grating), and imparts a suitable phase difference between the light of the area a, and the light of the area b1 and the area b2, within the beam by diffraction.

Herein, with the land and groove recording technique of the related art with a groove depth of $\lambda/6$, a round-trip phase difference of $2\times\lambda/6=\lambda/3$ is imparted between the reflected light component of a groove G and the reflected light component of a land L.

In the present embodiment, the depth dp of a groove G is set shallower than $\lambda/6$, in order to potentially solve the problems cause by groove depth discussed earlier. Specifically, in this example, $d=\lambda/12$ is set. In this case, the round-trip phase difference imparted due to the height difference between a groove G and a land L becomes $2\times\lambda/12=\lambda/6$.

Under such a depth dp setting, in order to realize crosstalk reduction effects similar to the land and groove recording technique of the related art with a groove depth of $\lambda/6$, it is sufficient for the phase mask 11 to impart an additional phase difference of $\lambda/6$, together with the phase difference of $\lambda/6$ due to the above height difference.

However, in actual practice it has been confirmed that simply inserting a phase mask 11 into the light path alone may not impart a designated phase difference between the reflected light components of a groove G and the reflected light components of a land L.

This point will be described below with reference to FIGS. 4 and 5.

Figure 4:
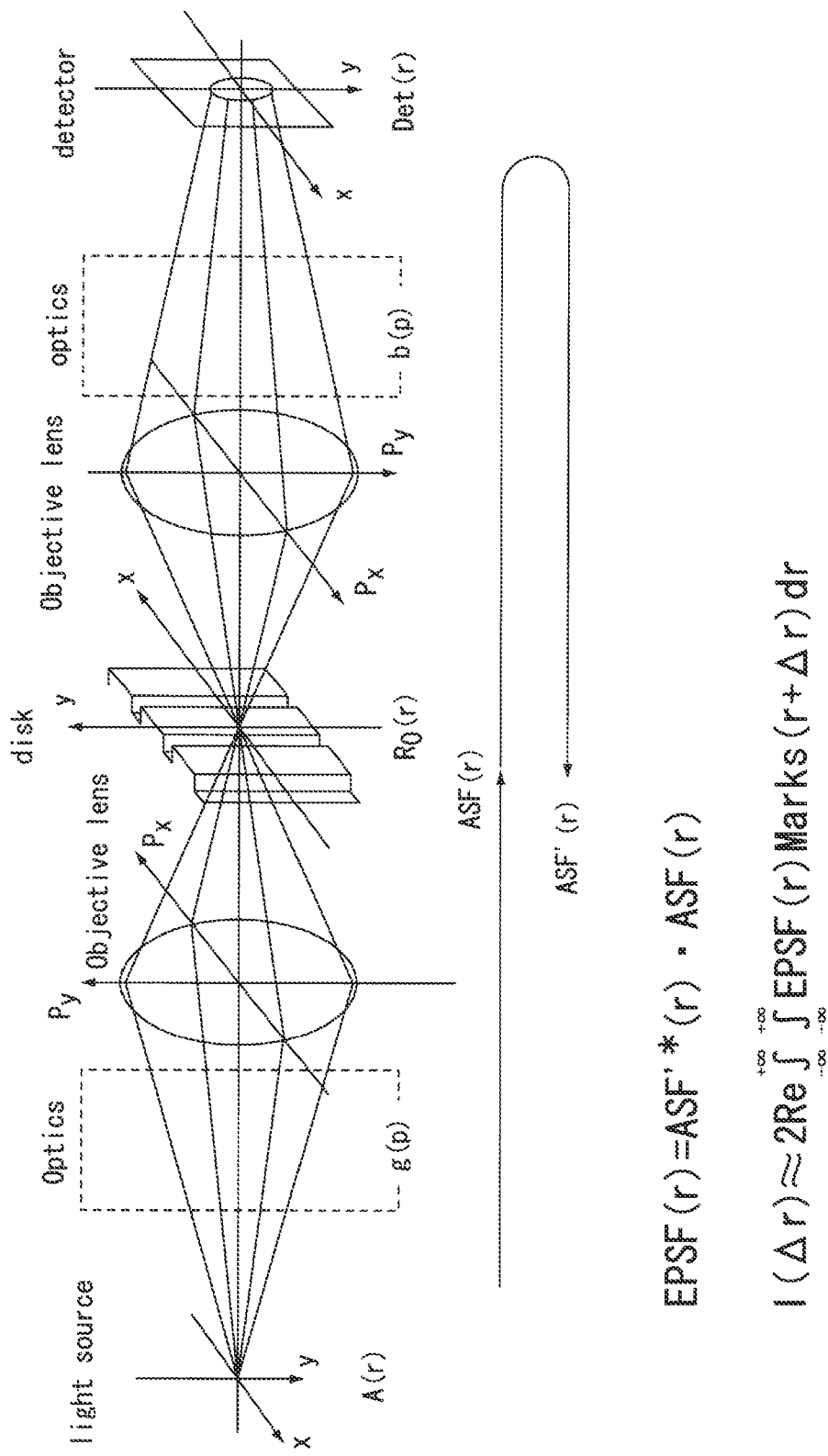
FIG. 4 is an explanatory diagram for an equivalent light spot.

FIG. 4 is an explanatory diagram for an equivalent light spot.

Note that the way of thinking about an equivalent light spot described below is also disclosed by the inventors in "Optical Disk Readout Analysis Using an Extended Point Spread Function," Kimihiro Saito, Kamon Uemura, Yoshiaki Kato, Satoshi Hineno, Yoshiyuki Matsumoto, Noriaki Nishi and Kiyoshi Toyota, Jpn. J. Appl. Phys. Vol. 39 (2000), pp. 693-697, Part 1, No. 2B, February 2000.

Although the above article should be referenced for details, the way of thinking about an equivalent light spot may be summarized as follows.

First, the reflectivity of an optical disc ("disk" in the drawing) is divided into a moving part ($R0(p)*Mark(p+\Delta p)$) and a non-moving part ($R0(p)$), and assuming that Eq. (4) in the above article holds, a playback signal obtained from the photodetection signal of a detector ("detector" in the drawing) may be calculated by the convolution of a virtual light spot called an EPSF and the moving part of a mark (Mark), as in Eq. (6) of the above article (see also the formula in the drawing).

EPSF is expressed as the product of two amplitude light spots, one being the complex conjugate of a light spot amplitude ($U(p)$) focused onto an optical disc from a light source, and the other being a light spot amplitude ($V(p)$) which is reflected off the non-moving part of the optical disc to reach the detector, is restricted by the detector, and then follows a virtual reverse light path to be projected onto the optical disc (see Eq. (7) in the above article).

It should be appreciated that ASF(r) in the drawing corresponds to the above light spot amplitude $U(p)$, while ASF'(r) in the drawing corresponds to the above virtual light spot amplitude $V(p)$.

Herein, in the case of land and groove recording of the related art with a groove depth of $\lambda/6$ as discussed earlier, a round-trip phase difference of $\lambda/3$ is imparted between a groove G and a land L. This may be considered to be equivalent to, for example, a case like the following: namely, a case in which a mark M is formed at a similar track pitch on an optical disk with no groove G, and in which a phase difference of $\lambda/3$ is imparted to the part of a neighboring track with respect to the center track (the readout track) in EPSF.

Actually, however, a phase may not be imposed onto EPSF, even if an element or the like for producing a phase difference is simply inserted into the light path.

FIG. 5A is a diagram explaining why.

In the example in FIG. 5A, reflected light from an optical disk obtained via an objective lens is simply condensed and detected.

In this configuration, a phase difference may not be imparted, even if a phase mask is inserted into the light path. In other words, with the configuration in FIG. 5A, although ASF becomes an ordinary light spot amplitude (ordinary in the sense that a phase difference is not imparted), with ASF', the phase due to the phase mask is canceled by the round trip via the detector, and ASF' becomes ASF. As a result, EPSF becomes $ASF \cdot ASF^* = |ASF|^2$, and a phase may not be imposed.

Note that although FIG. 5A illustrates an example in which the phase mask is made to act only on light on the return path (the light path from the recording surface of the optical disc to the detector) similarly to FIG. 1 earlier, when a phase mask is made to act only on light on the outward path (the light path from the light source to the recording surface of the optical disc), $ASF \cdot ASF'^* = |ASF|^2$ and a phase is similarly not imposed.

In consideration of this point, in the present embodiment, a phase mask 11 is provided, while in addition, a confocal optical system is implemented.

FIG. 5B schematically illustrates a confocal optical system.

Likewise in the optical system illustrated in FIG. 5B, a pinhole is disposed with respect to the confocal position, similarly to the optical system illustrated in FIG. 1. In other words, with the pinhole, light in the central part of reflected light (reflected light from an optical disc) at the confocal position is extracted, and the extracted light is detected by a detector.

By implementing such a confocal optical system, the phase (aberration) of the outward path portion in ASF' (the ASF' light path from the return path objective lens that reaches the detector via the phase mask) is shaped by extraction (in this case, extraction with a pinhole) of a central part at a confocal position, and thus the phase on the return path (the ASF' light path from the detector that reaches the optical disc via the phase mask) is preserved in ASF'.

As a result, a phase may be imposed onto EPSF.

According to a playback device of the present embodiment, in which a phase mask 11 is inserted into the light path and a confocal optical system is implemented in this way, even if the depth dp of a groove G is made shallower than the $\lambda/6$ of the related art, the phase mask 11 is able to compensate for the phase difference that is reduced due to the shallower depth. As a result, it is possible to obtain crosstalk reduction effects equal to the case of land and groove recording of the related art with a groove depth of $\lambda/6$.

1-3. Extraction Area Size

Herein, in order to obtain good crosstalk reduction effects, it is desirable to suitably set an extraction area size at the confocal position.

Figure 6:
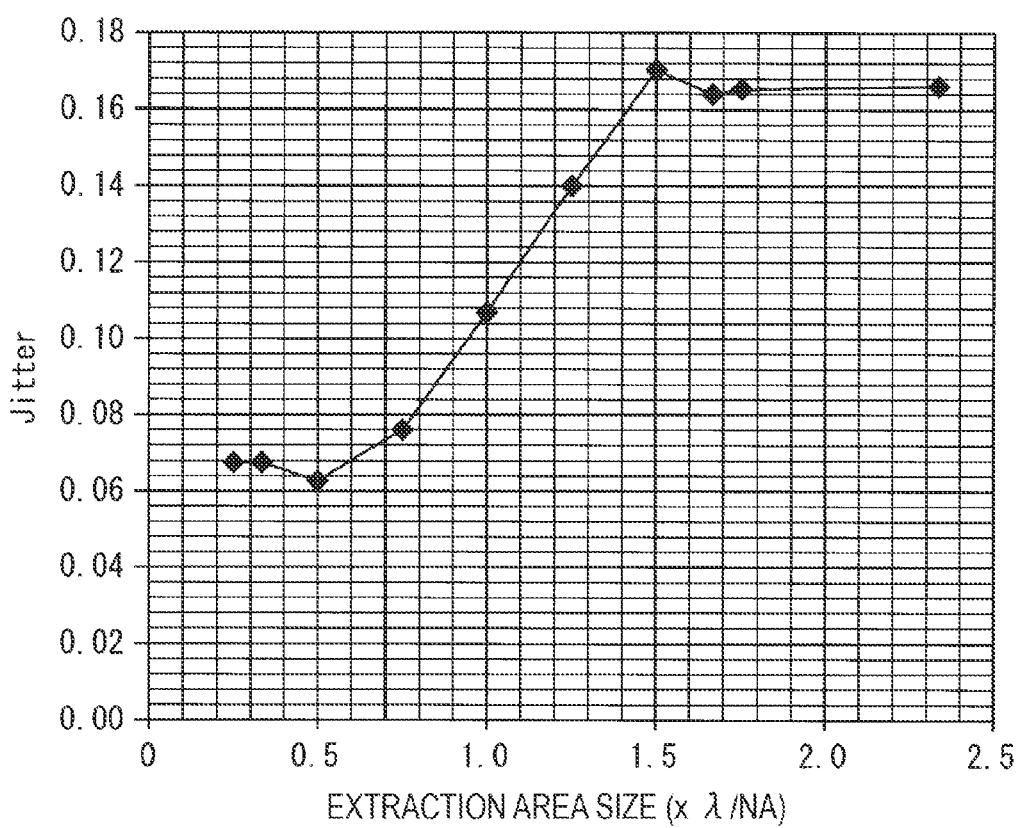
FIG. 6 is a diagram illustrating simulation results (extraction area size versus jitter) regarding the relationship between extraction area size and jitter.
Figure 7:
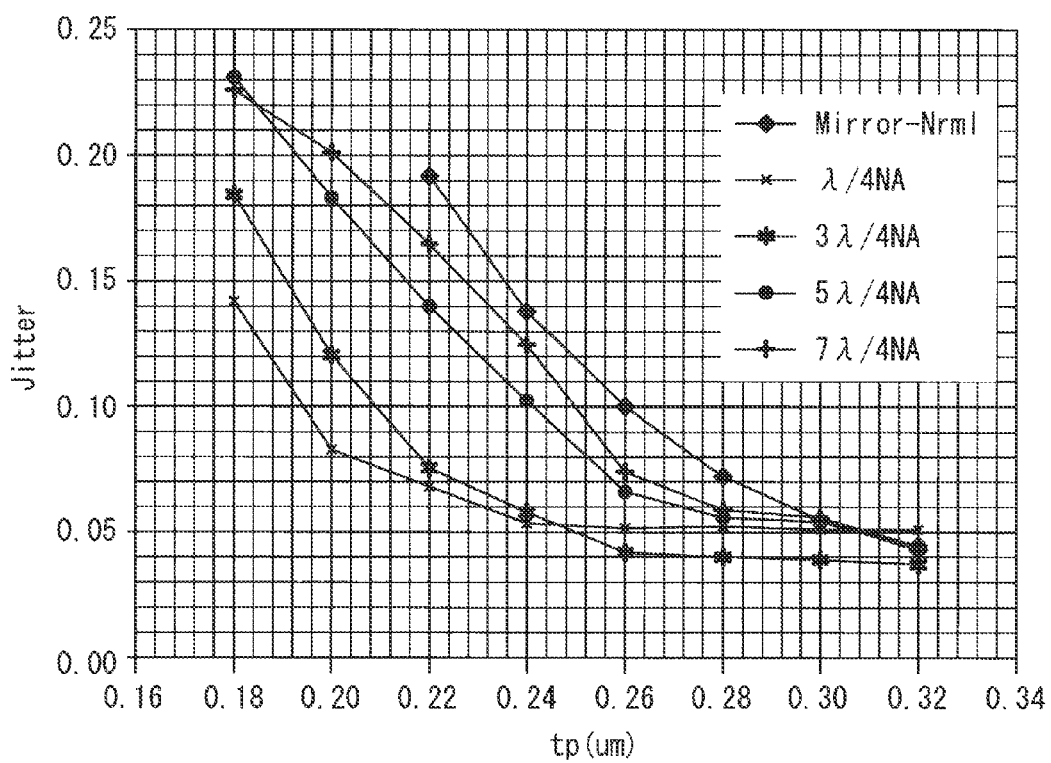
FIG. 7 likewise is a diagram illustrating simulation results (jitter change characteristics versus track pitch for respective extraction area sizes) regarding the relationship between extraction area size and jitter.
Figure 8:
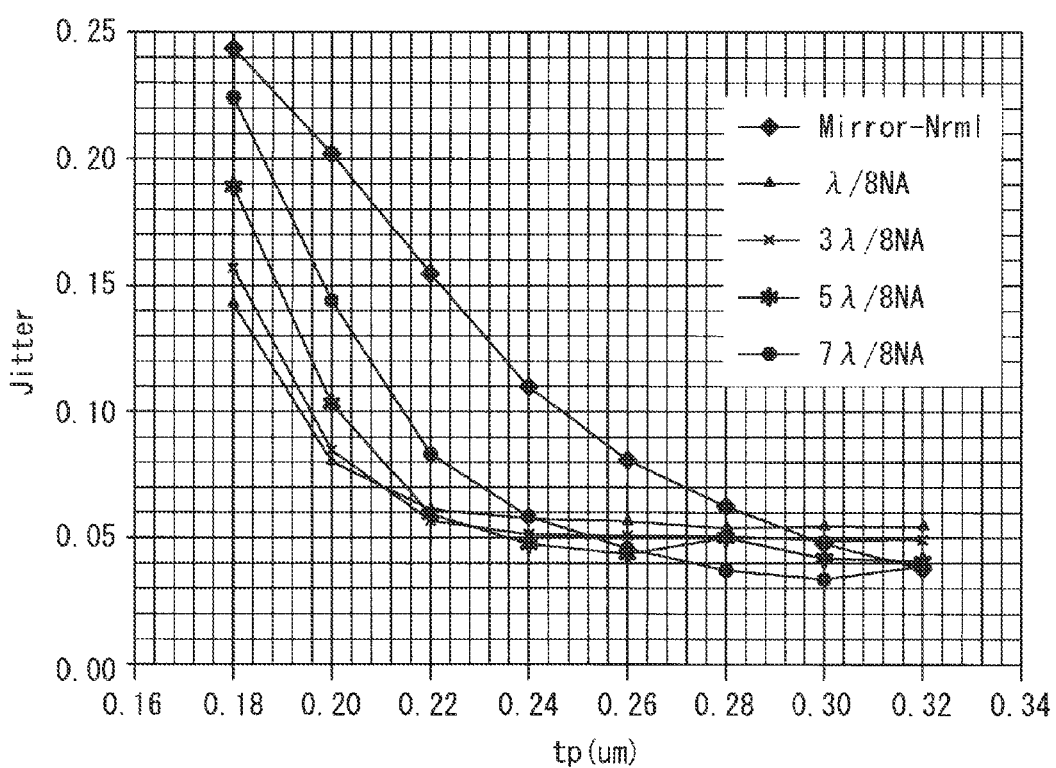
FIG. 8 likewise is a diagram illustrating simulation results (jitter change characteristics versus track pitch for respective extraction area sizes) regarding the relationship between extraction area size and jitter.

FIGS. 6, 7, and 8 illustrate the results of conducting simulations regarding the relationship between extraction area size (in this case, the size of the pinhole 7) and jitter.

Herein, the extraction area size at the confocal position is expressed as a diametrical size centered on the optical axis.

First, FIG. 6 illustrates jitter calculation results for the case of varying the extraction size at the confocal position under the condition of fixing the track pitch tp at 0.22 μm.

Note that in FIG. 6, the size of the pinhole 7 is expressed in terms of the diffraction limit ($\lambda$/NA). Herein, $\lambda$ is the recording/playback wavelength (the wavelength of laser light emitted by the laser 1), while NA is the numerical aperture of the objective lens 5.

Also, in the simulation in FIG. 6 as well as in FIGS. 7 and 8, the linear density of the optical disc D is taken to be 25 GBL, the depth of a groove dp is $\lambda$/12, the duty of the groove G/land L width is 50%, and the width of a recording mark M is 0.45 tp. Also, the diffraction grating pattern of the phase mask 11 corresponds to a diffraction pattern having a grating pitch of 0.34 μm, a groove depth of $\lambda$/5, and a duty of 50%.

Referring to FIG. 6, the relationship between the extraction area size and the jitter demonstrates that there is an inflection point where the extraction area size is 1.5 times the diffraction limit ($\lambda$/NA). Specifically, the jitter tends to decrease greatly when the extraction area size is in the region less than 1.5 times $\lambda$/NA. As in the drawing, this decreasing tendency stays nearly constant until approximately $\lambda$/NA×0.5, and in the region less than $\lambda$/NA×0.5, jitter enters a nearly flat state, although with a slight rise.

Given this point, it may be said that the extraction area size at the confocal position, or in other words the size of the pinhole 7 in this example, is desirably set to a size having a diameter less than 1.5$\lambda$/NA and centered on the optical axis.

Also, according to the results in FIG. 6 above, it may be said that the extraction area size at the confocal position is desirably set to a size of $\lambda$/NA or less in order to obtain better crosstalk reduction effects.

FIG. 7 illustrates calculated results regarding jitter change characteristics versus track pitch tp for an extraction area size of $\lambda$/4 NA, 3$\lambda$/4 NA, 5$\lambda$/4 NA, and 7$\lambda$/4 NA, respectively.

Also, FIG. 8 illustrates calculated results regarding jitter change characteristics versus track pitch tp for an extraction area size of $\lambda$/8 NA, 3$\lambda$/8 NA, 5$\lambda$/8 NA, and 7$\lambda$/8 NA, respectively.

Note that for the sake of comparison, FIGS. 7 and 8 illustrate the result for the case of reading out, with an ordinary optical system (no phase mask 11 and also no extraction of central light with a confocal optical system), an optical disc in which a recording mark sequence is formed on a minor surface in which a groove G is not formed (Mirror-Nrml in the drawing).

The results in FIGS. 7 and 8 likewise confirm that there is a tendency for crosstalk reduction effects to rise with smaller extraction area sizes for sizes of less than 1.5$\lambda$/NA (particularly for the case in which tp=0.24 μm or less).

1-4. Advantageous Effects

Figure 9:
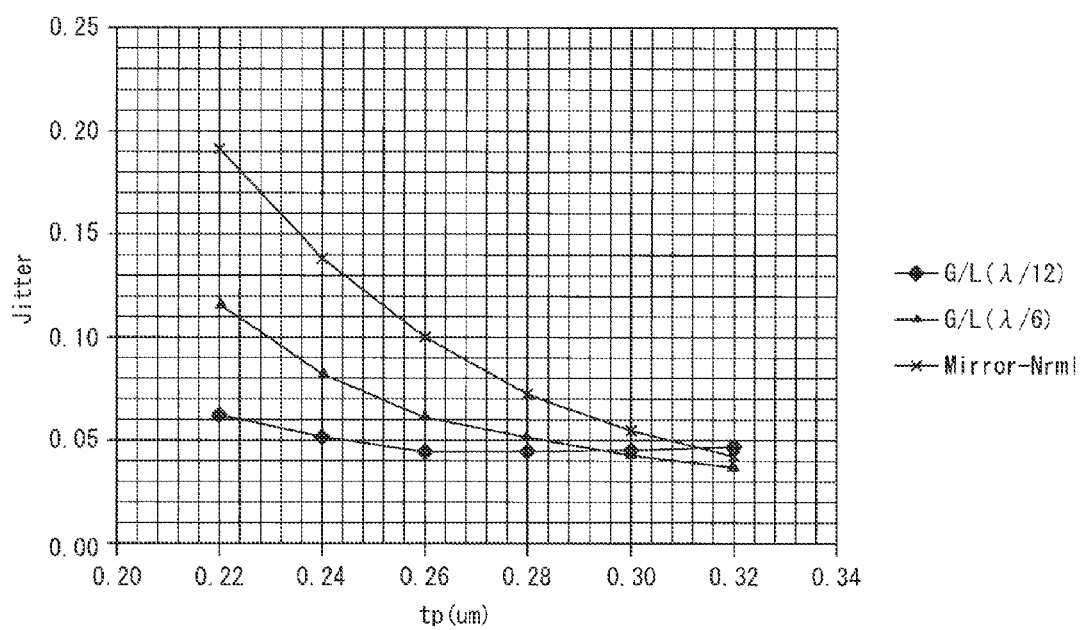
FIG. 9 is a diagram illustrating simulation results regarding jitter change characteristics versus track pitch, in contrast with a land and groove recording technique of the related art with a groove depth of λ/6.

To confirm the advantageous effects of a playback device according to the first embodiment described above, a comparison against a land and groove recording technique of the related art with a groove depth of $\lambda$/6 is illustrated in FIG. 9.

FIG. 9 illustrates simulation results regarding jitter change characteristics versus track pitch tp. In the drawing, characteristics plotted with a diamond sign express the characteristics of the present embodiment (G/L ($\lambda$/12)), while characteristics plotted with a triangle sign express the characteristics of a land and groove recording technique with a groove depth of $\lambda$/6 (G/L ($\lambda$/6)). Also, the characteristics of "Mirror-Nrml" discussed above (plotted with an X sign) are additionally illustrated in the drawing as a reference.

Note that in the simulation in FIG. 9, the linear density of the optical disc D is likewise taken to be 25 GBL, the duty of the groove G/land L width is 50%, and the width of a recording mark M is 0.45 tp, similarly to the previous FIGS. 6 to 8. Also, for the characteristics of the present embodiment, characteristics are illustrated for an extraction area size of 3$\lambda$/8 NA, and similarly to the previous FIGS. 6 to 8, the diffraction grating pattern of the phase mask 11 corresponds to a diffraction pattern having a grating pitch of 0.34 μm, a groove depth of $\lambda$/5, and a duty of 50%.

FIG. 9 demonstrates that, according to the present embodiment, there are obtained crosstalk reduction effects nearly equal to a land and groove recording technique of the related art with a groove depth of $\lambda$/6.

Particularly, according to the present embodiment, a further increase in crosstalk reduction effects may be confirmed in the region in which the track pitch is 0.28 μm or less.

According to the present embodiment configured in this way, it is possible to obtain crosstalk reduction effects that are similar to the case of forming a groove with a depth of $\lambda$/6 in the related art, even if a groove G has a depth dp of less than $\lambda$/6. Consequently, it is possible to potentially solve the problems faced by techniques of the related art that form a groove with a depth of $\lambda$/6, specifically, the problem of easily occurring land/groove discrepancies in the recording/playback characteristics, the problem of worsened release during disc formation, and in addition, the problem of worsened S/N in the focus error signal in the astigmatic method.

Also, according to the present embodiment, since a reduction in crosstalk may be realized by implementing a confocal optical system for the optical system and inserting a phase mask 11 into the light path, the present embodiment does not lead to a more complex configuration such as in the case of attempting to reduce crosstalk by signal processing in the related art. Furthermore, there is no need to form three beam spots in order to simultaneously read out the readout track and the neighboring (×2) tracks, and a configuration that separately detects reflected light from each of the beam spots is likewise unnecessary, and thus there is no risk of making the configuration of the optical system more complex.

Also, in the present embodiment, the phase mask 11 is inserted at a position at which a phase difference is imparted only to light on the return path from among the outward path and the return path. Thus, the effects of the phase mask 11 imparting a phase difference may be made to not affect the servo system. As a result, degraded servo performance is potentially prevented.

2. Second Embodiment

Next, a second embodiment will be described.

Figure 10:
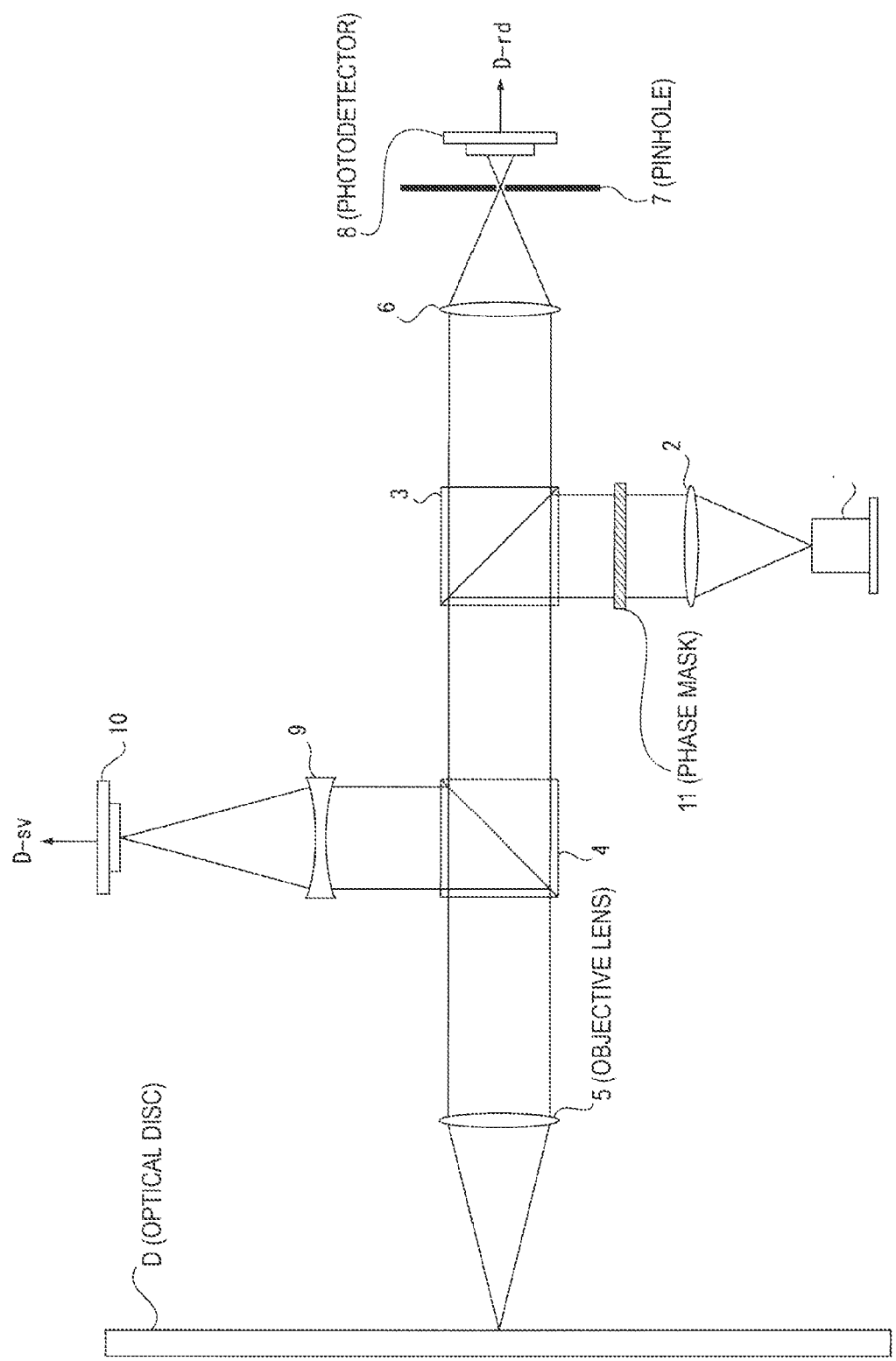
FIG. 10 is an explanatory diagram regarding a configuration of a playback device according to the second embodiment.

FIG. 10 is an explanatory diagram regarding a configuration of a playback device according to the second embodiment.

Note that in the following description, portions that are similar to portions already described are given the same signs, and description thereof is reduced or omitted.

The second embodiment uses an optical disc D in which a groove G is formed with a depth dp of less than $\lambda$/6, similarly to the case of the first embodiment (this case is likewise land and groove recording), but the insertion position of the phase mask 11 is set such that a phase difference is imparted only to light on the outward path rather than the return path.

Specifically, the phase mask 11 in this case is inserted between the collimating lens 2 and the beam splitter 3, as in the drawing. Note that, besides the change in the insertion position of the phase mask 11, the configuration is similar to the playback device of the first embodiment earlier.

As described earlier with reference to FIGS. 4 and 5, in the case where the phase difference imparting is made to act on only the outward path light, a phase likewise may not be imposed on EPSF by simply condensing and detecting reflected light from the optical disc D at a photodetector.

Accordingly, in the second embodiment in which the phase mask 11 is inserted at a position at which a phase difference is imparted only to outward path light, a confocal optical system is likewise implemented, thereby enabling a phase to be imposed on EPSF with the phase mask 11, similarly to the case of the first embodiment.

According to such a second embodiment, and similarly to the first embodiment, it is likewise possible to obtain crosstalk reduction effects similar to the related art, even if the depth dp of a groove G is made shallower than the $\lambda/6$ of the related art.

3. Third Embodiment

Figure 11:
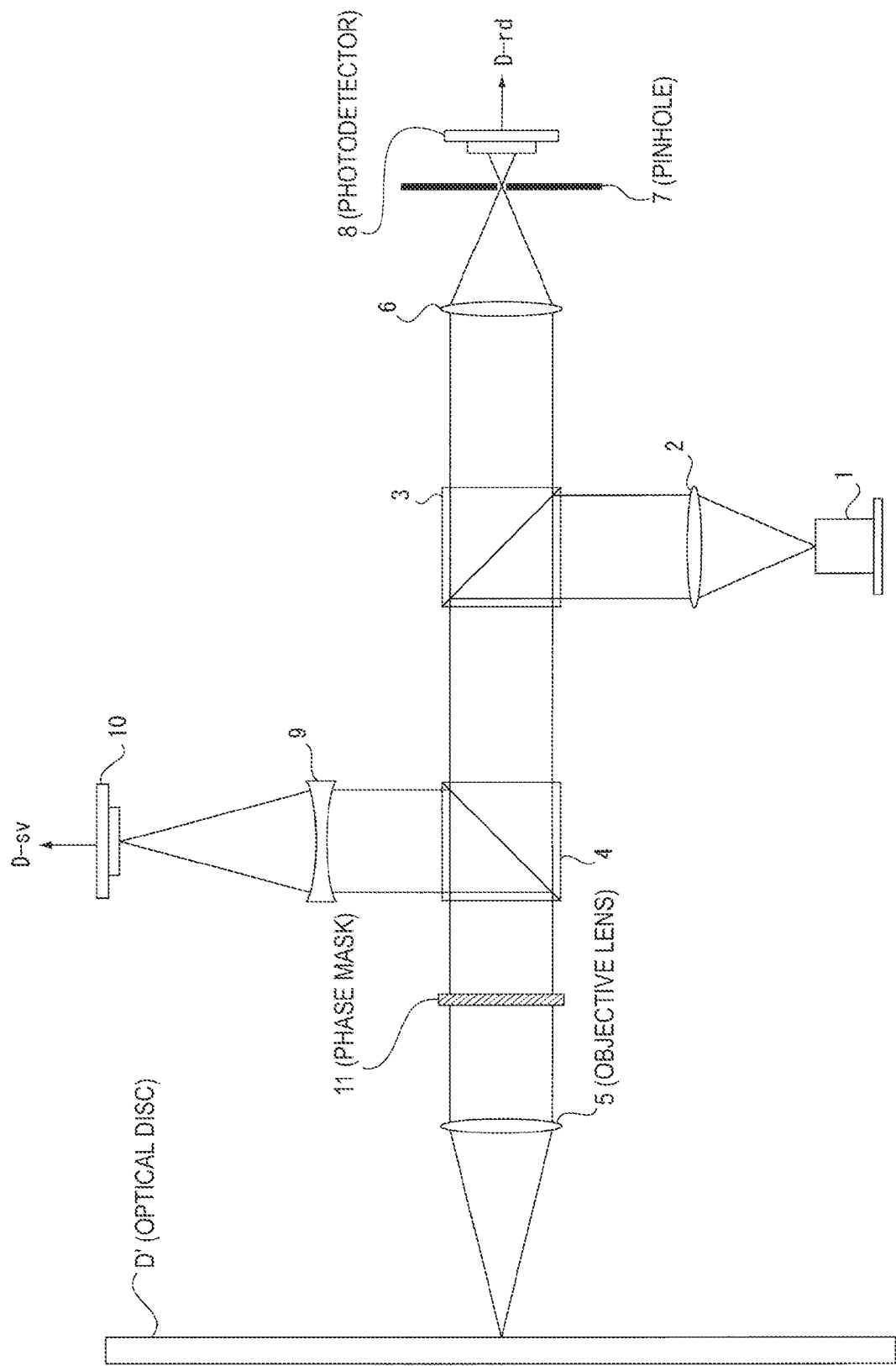
FIG. 11 is an explanatory diagram regarding a configuration of a playback device according to the third embodiment.

FIG. 11 is an explanatory diagram regarding a configuration of a playback device according to the third embodiment.

The third embodiment uses an optical disc D' in which a groove G is not formed on the recording surface rather than an optical disc D in which a groove G is formed on the recording surface, and in addition, inserts a phase mask 11 such that a phase difference is imparted to both outward path light and return path light.

Figure 12:
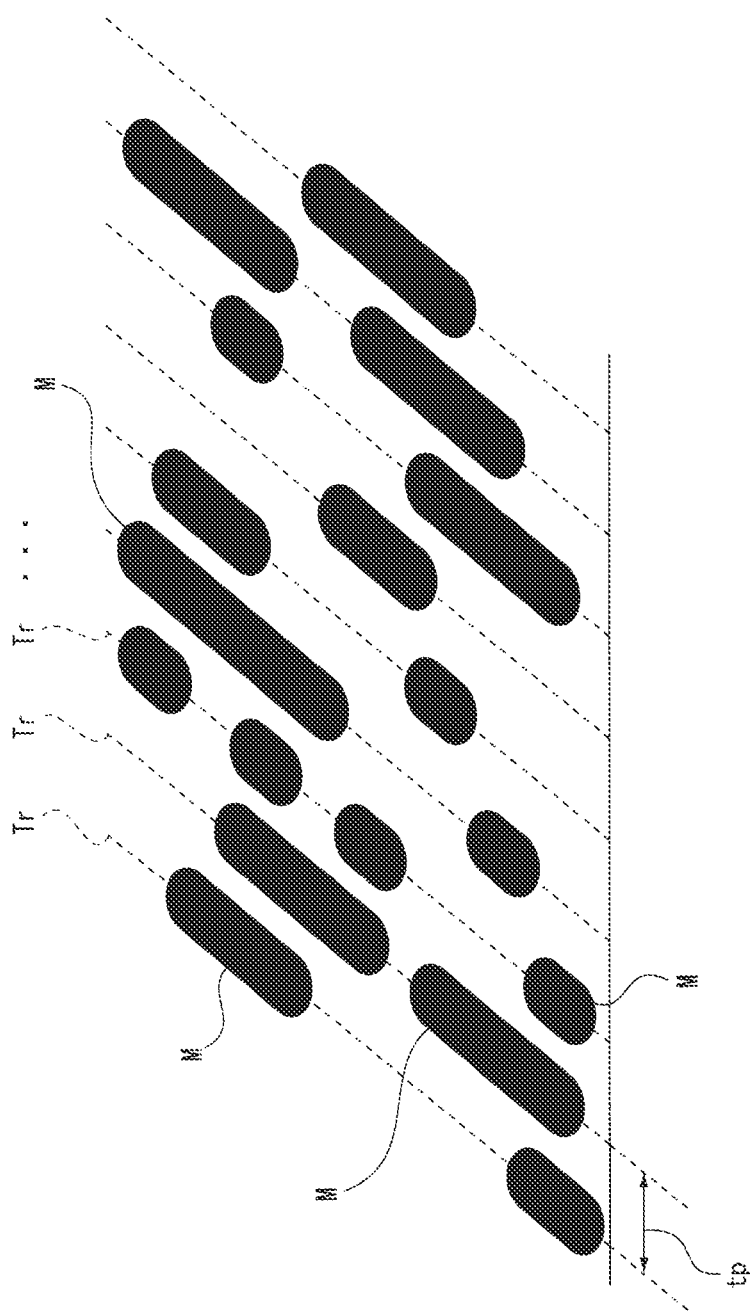
FIG. 12 is a perspective view schematically illustrating the recording surface of an optical disc used in the third embodiment.

For reference, the state of the recording surface of the optical disc D' is schematically illustrated in the perspective view in FIG. 12.

As illustrated in the drawing, on the recording surface of the optical disc D', recording marks M are arranged on a flat surface on which a groove G is not formed. In the case of the present example, the recording marks M are taken to be formed in a spiral shape on the recording surface.

On this optical disc D', recording mark sequences form tracks (Tr in the drawing), and the spacing of the tracks made up of these recording mark sequences is the track pitch tp, as in the drawing.

The description will now return to FIG. 11.

In the playback device according to the third embodiment, a phase mask 11, which is used to impart a phase difference between the reflected light component from a track to be read out and the reflected light component from a track neighboring the track to be read out, is inserted at a position at which a phase difference is imparted to both outward path light and return path light. Specifically, in the case of the present example, the phase mask 11 is disposed between the objective lens 5 and the beam splitter 4, as in the drawing.

It should be appreciated that in order for the phase mask 11 in this case to impart a phase difference between the reflected light component from a track to be read out and the reflected light component from a track neighboring the track to be read out, it is likewise sufficient to set an area a and areas b1 and b2, similar to the phase mask 11 used in the foregoing first and second embodiments.

In this case, the phase difference to impart is preferably large to the extent that a groove G is not formed on the optical disc D' (in order to obtain equal crosstalk reduction effects). For this reason, the phase mask 11 is inserted at a position at which a phase difference is imparted to both outward path light and return path light, such that the phase difference imparted between the reflected light components of the read-out track and the reflected light component of a neighboring track becomes large.

Also, in this case, implementing a confocal optical system similarly to the first and second embodiments likewise enables the phase mask 11 to impart a phase difference to EPSF discussed earlier.

It should be appreciated that since this case uses an optical disc D' on which a groove G is not formed, the phase mask 11 alone becomes responsible for imparting the phase difference of $\lambda/3$ used to obtain crosstalk reduction effects equal to the land and groove recording technique of the related art with a groove depth of $\lambda/6$.

As above, since the phase mask 11 in this case is disposed so as to impart a phase difference round-trip, in order to realize the above phase difference imparting of $\lambda/3$, the phase mask 11 in this case may be configured to be able to impart a phase difference of $\lambda/6$ (a phase difference between the earlier area a, and the areas b1 and b2) to the respective incident light on the outward path/return path.

Figure 13:
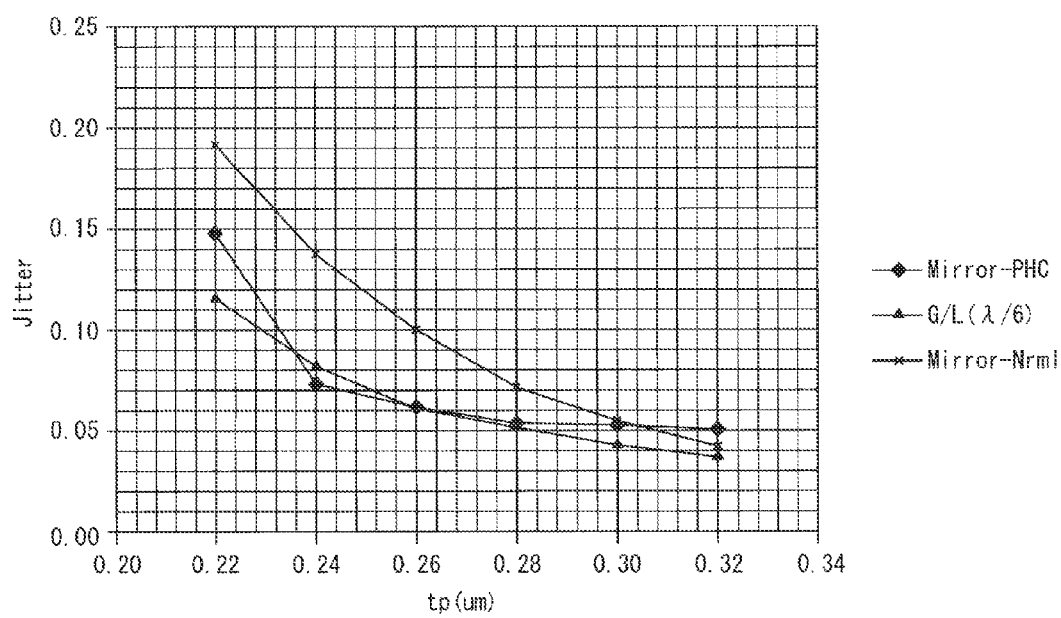
FIG. 13 is a diagram illustrating simulation results regarding jitter change characteristics versus track pitch according to the third embodiment.

FIG. 13 illustrates simulation results regarding jitter change characteristics versus track pitch for a playback device according to the third embodiment described above (in the drawing, "Mirror-PHC" plotted with a diamond sign).

Note that for the sake of comparison, FIG. 13 additionally illustrates characteristics for the case of implementing a land and groove recording technique of the related art with a groove depth of $\lambda/6$ (plotted with a triangle sign), and the earlier "Mirror-Nrml" characteristics (plotted with an X sign).

Note that in the simulation in FIG. 13, the linear density of the optical disc D is likewise taken to be 25 GBL, similarly to the previous FIGS. 6 to 8. Also, the width of a recording mark M is taken to be 0.45 tp.

Also, regarding the characteristics of the third embodiment, the extraction area size is taken to be $\lambda/NA/2.1$. Also, the diffraction grating pattern of the phase mask 11 corresponds to a diffraction pattern having a grating pitch of 0.34 μm, a groove depth of $\lambda/6$, and a duty of 50%.

The results in FIG. 13 demonstrate that, according to the third embodiment, there are likewise obtained crosstalk reduction effects nearly equal to the case of implementing a land and groove recording technique of the related art with a groove depth of $\lambda/6$.

As the above description demonstrates, according to the third embodiment, it is possible to obtain crosstalk reduction effects that are similar to a land and groove recording technique of the related art with a groove depth of $\lambda/6$, even if a groove G is not formed on the recording surface. In other words, as a result, with the third embodiment it is likewise possible to obtain crosstalk reduction effects similar to the related art while also resolving the problems faced by a technique of forming a groove with a depth of $\lambda/6$ in the related art, similarly to the earlier case of the first and second embodiments.

Also, according to the third embodiment, since a reduction in crosstalk may be realized by implementing a confocal optical system for the optical system and inserting a phase mask 11 into the light path, the present embodiment is also able to solve the problems faced by the technique of attempting to reduce crosstalk by signal processing in the related art.

Note that although the third embodiment uses an optical disc D' on which a groove G is not formed on the recording surface, this does not necessarily mean that a groove G is not formed over the entirety of the recording surface. In other words, it is sufficient for an optical disc used in the third embodiment to have a flat surface on which a groove G is not formed on at least a partial area of the recording surface, with a recording mark sequence formed on that flat surface.

4. Exemplary Modifications

The foregoing thus describes respective embodiments according to the present technology, but the present technology is not to be limited to the specific examples described heretofore.

For example, the phase difference imparting pattern by the phase mask 11 is not to be limited to the pattern illustrated in the earlier FIG. 3.

Figure 14:
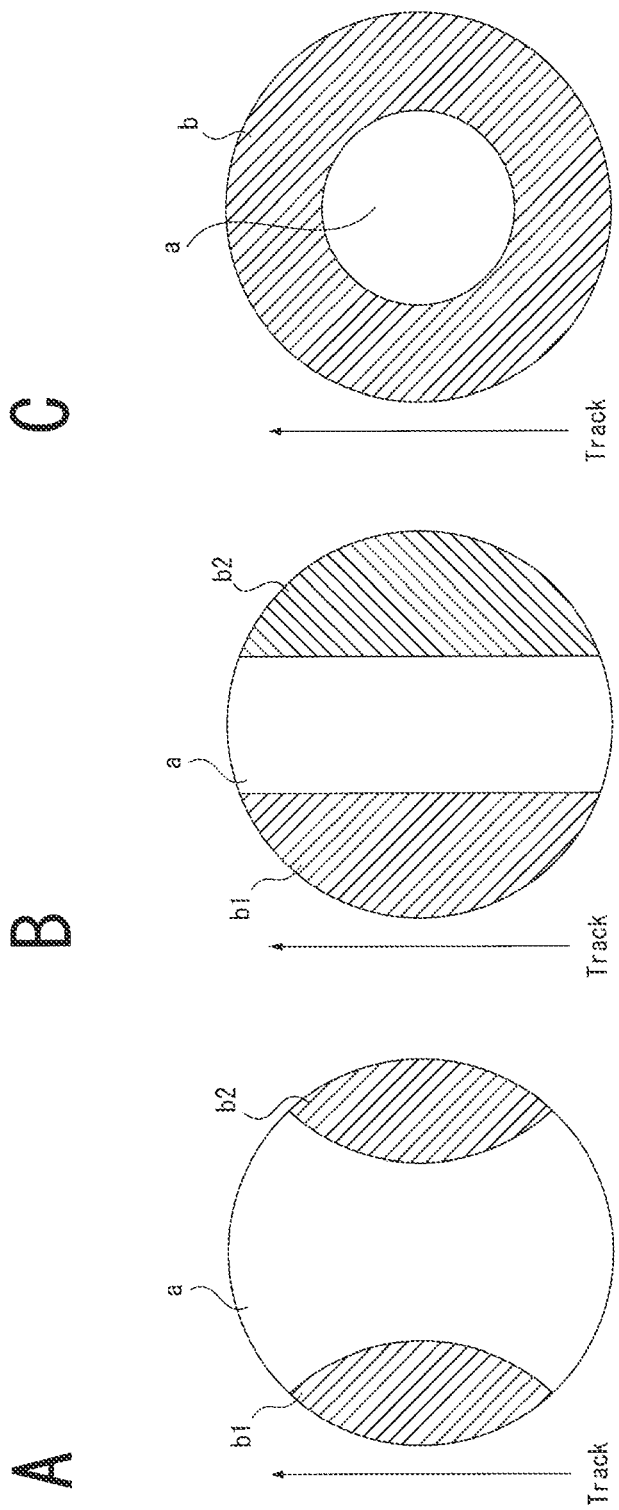
FIG. 14 is an explanatory diagram regarding exemplary modifications of phase difference imparting patterns.

FIG. 14 is an explanatory diagram regarding exemplary modifications of phase difference imparting patterns.

As illustrated in FIG. 14A, for example, the phase difference imparting pattern may also be given a smoother boundary between the area a and the areas b1 and b2 than the case of FIG. 3, making a pattern having a boundary shape somewhat like the stitches on a baseball. This may also be described as a shape like a diffraction pattern due to a groove.

Alternatively, a pattern having a boundary shape given by straight lines extending parallel in the track direction as in FIG. 14B (a strip pattern) may also be implemented as the shape of the boundary between the area a and the areas b1 and b2. Also, a pattern having a circular boundary shape as in FIG. 14C (a ring pattern) may be implemented (in this case, there are two types of areas, an area a and an area b).

With the present technology, in order to impart a designated phase difference between the reflected light component of a track to read out (the center track) and the reflected light component of a track neighboring the track to read out, it is sufficient to at least set a pattern that is symmetrical about the center track as the phase difference imparting pattern.

Also, although the foregoing description exemplifies the case of disposing a pinhole 7 to realize a confocal optical system, a confocal optical system may also be realized by disposing, at the confocal position, a photodetector 8 in which the size of the photosensitive area is a size less than 1.5λ/NA.

Meanwhile, although the foregoing first and second embodiments are described while presuming the case of reading out one of either a groove G or a land L, in actuality, the ability to read and distinguish between recorded information on a groove G and recorded information on a land L is demanded of a playback device.

At this point, provided that the depth dp of a groove G is λ/12 as exemplified earlier, for example, due to the height difference equivalent to this λ/12, a phase difference of λ/6 is imparted between the reflected light component of a groove G and the reflected light component of a land L existing within a beam. Specifically, the phase of the reflected light component of a groove G is delayed by λ/6 with respect to the phase of the reflected light component of a land L.

At this point, provided that a groove G is to be read out, for example, in order to impart a phase difference equivalent to the λ/3 for obtaining crosstalk reduction effects equal to the technique of forming a groove with a depth of λ/6 in the related art, it is sufficient to configure the phase mask 11 to advance by λ/6 the phase of light in the areas b1 and b2 (in this case, the areas corresponding to the reflected light components of lands L which are the neighboring tracks) with respect to the light in the area a (in this case, the area corresponding to the reflected light component of the groove G to be read out).

In contrast, in the case where a land L is to be read out, in order to impart a phase difference equivalent to the above λ/3, it is sufficient to configure the phase mask 11 to delay by λ/6 the phase of light in the areas b1 and b2 (in this case, the areas corresponding to the reflected light components of grooves G which are the neighboring tracks) with respect to the light in the area a (in this case, the area corresponding to the reflected light component of the land L to be read out). In other words, in this case, if the phase of light in the areas b1 and b2 is advanced by λ/6 similarly to the above, the λ/6 phase advance occurring in the reflected light component of a land L due to the groove G/land L height difference is canceled out, and the total phase difference becomes 0.

In this way, using a phase mask 11 in which the phase difference imparting pattern is fixed may be insufficient to appropriately read and distinguish a groove G from a land L.

Figure 15:
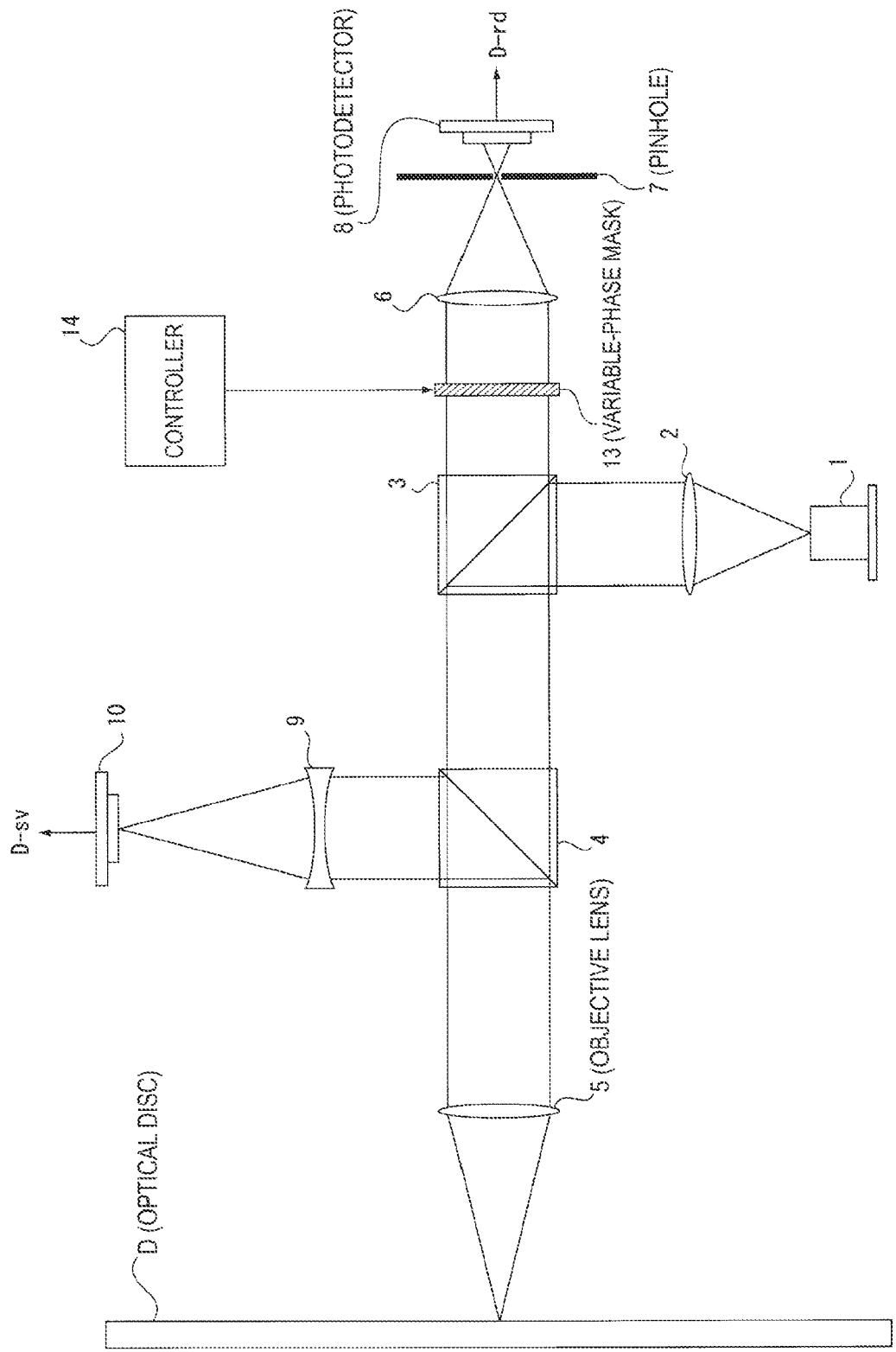
FIG. 15 is an explanatory diagram regarding an exemplary modification using a variable-phase mask.

Accordingly, as illustrated in FIG. 15, a variable-phase mask 13 configured to be able to vary the phase difference imparting pattern is used, and the phase difference imparting pattern for the variable-phase mask 13 is switched by the controller 14 in the drawing when reading a groove G and when reading a land L.

At this point, an element able to vary the phase difference according to a control signal, such as a liquid crystal element, for example, is used as the variable-phase mask 13.

Note that although the drawing exemplifies the case of disposing the variable-phase mask 13 at a position at which a phase difference is only imparted to return path light (specifically, between the beam splitter 3 and the condenser lens 6), the present modification is also applicable to the case of disposing the variable-phase mask 13 at a position at which a phase difference is only imparted to outward path light, as illustrated in FIG. 10 earlier.

When reading out a groove G, the controller 14 controls the phase difference imparting pattern for the variable-phase mask 13 so as to advance by λ/6 the phase of light in the areas b1 and b2 with respect to the phase of light in the area a. Also, when reading out a land L, the controller 14 controls the phase difference imparting pattern for the variable-phase mask 13 so as to delay by λ/6 the phase of light in the areas b1 and b2 with respect to the phase of light in the area a.

With such a configuration, for example, it becomes possible to read and distinguish between recorded information on a groove G and recorded information on a land L.

Note that the configuration for realizing the reading and distinguishing between recorded information on a groove G and recorded information on a land L is not to be limited to that described with FIG. 15.

For example, reading and distinguishing between a groove G and a land L is also possible with a configuration that uses an optical system for reading out a groove G and an optical system for reading out a land L, for a total of two independent optical systems (readout heads), in which a phase mask 11 configured to advance by λ/6 the phase of light in the areas b1 and b2 with respect to the phase of light in the area a is inserted into the optical system for reading out a groove G, and a phase mask 11 configured to delay by λ/6 the phase of light in the areas b1 and b2 with respect to the phase of light in the area a is inserted into the optical system for reading out a land L.

According to such a configuration, for example, it becomes possible to use fixed phase masks 11 in order to read and distinguish between a groove G/land L.

Also, the foregoing description exemplifies the case of implementing a configuration that imparts a phase difference to only one of either an outward path and a return path in the case of using an optical disc D on which a groove G is formed, and implementing a configuration that imparts a phase difference to both the outward path and the return path in the case of using an optical disc D' on which a groove G is not formed. Conversely, however, it is also possible to implement a configuration that imparts a phase difference to both the outward path and the return path in the case of using the optical disc D, and implement a configuration that imparts a phase difference to only one of either the outward path and the return path in the case of using the optical disc D'.

Likewise in these cases, by suitably setting a phase difference to be imparted by a phase mask, it is possible to obtain crosstalk reduction effects that are similar to the case of adopting a land and groove recording technique of the related art with a groove depth of $\lambda/6$.

Also, although the foregoing description exemplifies the case in which a groove G is formed in a spiral shape on the optical disc D used in the first and second embodiments, and in which a recording mark sequence (track) is similarly formed in a spiral shape on the optical disc D' used in the third embodiment, a groove G and a recording mark sequence M may also be formed in concentric circular shapes rather than a spiral shape.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A playback device including:
  a light source;
  an objective lens that radiates light emitted by the light source onto an optical recording medium, and onto which is incident reflected light obtained from a recording surface of the optical recording medium in accordance with the radiated light;
  a condenser lens, onto which is incident the reflected light obtained via the objective lens, that condenses the reflected light;
  a photodetecting section configured in a manner that, provided that a confocal position is a focal position of the condenser lens when the light emitted by the light source is focused onto the recording surface by the objective lens, $\lambda$ is a wavelength of light radiated onto the optical recording medium by the objective lens, and NA is a numerical aperture of the objective lens, the photodetecting section extracts and detects light within a range of a diameter less than $1.5\lambda/NA$ centered on an optical axis at the confocal position, the light being central light of the reflected light at the confocal position; and
  a phase difference imparting section, inserted on a light path from the light source to the photodetecting section, that imparts a designated phase difference between a reflected light component from a readout track and a reflected light component from a track neighboring the readout track from among tracks formed on the recording surface of the optical recording medium.

(2) The playback device according to (1), wherein
  the photodetecting section extracts the central light of the reflected light with a pinhole disposed at the confocal position.

(3) The playback device according to (1) or (2), wherein
  provided that a groove with a depth less than $\lambda/6$ is formed on the recording surface, and a recording mark sequence is formed on both the groove and a land disposed between the groove, and in addition,
  provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on only one of the outward path and the return path.

(4) The playback device according to (3), wherein
  the phase difference imparting section is configured in a manner that a total phase difference made up of a phase difference produced between light reflected off the groove and light reflected off the land, and a phase difference between a reflected light component from the groove and a reflected light component from the land that is imparted by the phase difference imparting section, becomes $\lambda/3$.

(5) The playback device according to (3) or (4), wherein
  the phase difference imparting section is configured to be capable of varying a phase difference imparted between a reflected light component from the groove and a reflected light component from the land, and
  the phase difference imparting section is equipped with a controller that controls the phase difference imparting section in a manner that the phase difference imparted between the reflected light component from the groove and the reflected light component from the land is varied between when reading out the groove and when reading out the land.

(6) The playback device according to any one of (3) to (5), wherein
  the phase difference imparting section is inserted at a position that imparts a phase difference only to light on the return path from among the outward path and the return path.

(7) The playback device according to (1) or (2), wherein, in the optical recording medium,
  a recording mark sequence is formed in a concentric circular shape or a spiral shape on a same flat surface on the recording surface, and
  provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on both of the outward path and the return path.

(8) The playback device according to (7), wherein
  the phase difference imparting section is configured to impart a phase difference of $\lambda/6$ to incident light.

(9) The playback device according to (1) or any one of (3) to (8), wherein
  the photodetecting section detects the central light of the reflected light with a photosensor, positioned at the confocal position, with a size less than $1.5\lambda/NA$.

What is claimed is:
1. A playback device comprising:
  a light source;
  an objective lens that radiates light emitted by the light source onto an optical recording medium, and onto which is incident reflected light obtained from a recording surface of the optical recording medium in accordance with the radiated light;
  a condenser lens, onto which is incident the reflected light obtained via the objective lens, that condenses the reflected light;
  a photodetecting section configured in a manner that, provided that a confocal position is a focal position of the condenser lens when the light emitted by the light source is focused onto the recording surface by the objective lens, $\lambda$ is a wavelength of light radiated onto the optical recording medium by the objective lens, and NA is a numerical aperture of the objective lens, the photodetecting section extracts and detects light within a range of a diameter less than $1.5\lambda/NA$ centered on an optical axis at the confocal position, the light being central light of the reflected light at the confocal position; and a phase difference imparting section, inserted on a light path from the light source to the photodetecting section, that imparts a designated phase difference between a reflected light component from a readout track and a reflected light component from a track neighboring the readout track from among tracks formed on the recording surface of the optical recording medium, wherein the photodetecting section extracts the central light of the reflected light with a pinhole disposed at the confocal position.

2. The playback device according to claim 1, wherein provided that a groove with a depth less than $\lambda/6$ is formed on the recording surface, and a recording mark sequence is formed on both the groove and a land disposed between the groove, and in addition, provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on only one of the outward path and the return path.

3. The playback device according to claim 2, wherein the phase difference imparting section is configured in a manner that a total phase difference made up of a phase difference produced between light reflected off the groove and light reflected off the land, and a phase difference between a reflected light component from the groove and a reflected light component from the land that is imparted by the phase difference imparting section, becomes $\lambda/3$.

4. The playback device according to claim 2, wherein the phase difference imparting section is configured to be capable of varying a phase difference imparted between a reflected light component from the groove and a reflected light component from the land, and the phase difference imparting section is equipped with a controller that controls the phase difference imparting section in a manner that the phase difference imparted between the reflected light component from the groove and the reflected light component from the land is varied between when reading out the groove and when reading out the land.

5. The playback device according to claim 2, wherein the phase difference imparting section is inserted at a position that imparts a phase difference only to light on the return path from among the outward path and the return path.

6. The playback device according to claim 1, wherein, in the optical recording medium, a recording mark sequence is formed in a concentric circular shape or a spiral shape on a same flat surface on the recording surface, and provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on both of the outward path and the return path.

7. The playback device according to claim 6, wherein the phase difference imparting section is configured to impart a phase difference of $\lambda/6$ to incident light.

8. The playback device according to claim 1, wherein the photodetecting section detects the central light of the reflected light with a photosensor, positioned at the confocal position, with a size less than $1.5\lambda/NA$.

9. A playback method for a playback device in which light emitted by a light source is radiated onto an optical recording medium via an objective lens, and reflected light obtained from a recording surface of the optical recording medium in accordance with the radiated light is condensed by a condenser lens and detected by a photodetecting section, the playback method comprising:

imparting, on a light path from the light source to the photodetecting section, a designated phase difference between a reflected light component from a readout track and a reflected light component from a track neighboring the readout track from among tracks formed on the recording surface of the optical recording medium; and provided that a confocal position is a focal position of the condenser lens when light emitted by the light source is focused onto the recording surface by the objective lens, $\lambda$ is a wavelength of light radiated onto the optical recording medium by the objective lens, and NA is a numerical aperture of the objective lens, extracting and detecting light within a range of a diameter less than $1.5\lambda/NA$ centered on an optical axis at the confocal position, the light being central light of the reflected light at the confocal position, wherein the central light of the reflected light is extracted with a pinhole disposed at the confocal position.

10. A playback device comprising:

a light source;

an objective lens that radiates light emitted by the light source onto an optical recording medium, and onto which is incident reflected light obtained from a recording surface of the optical recording medium in accordance with the radiated light;

a condenser lens, onto which is incident the reflected light obtained via the objective lens, that condenses the reflected light;

a photodetecting section configured in a manner that, provided that a confocal position is a focal position of the condenser lens when the light emitted by the light source is focused onto the recording surface by the objective lens, $\lambda$ is a wavelength of light radiated onto the optical recording medium by the objective lens, and NA is a numerical aperture of the objective lens, the photodetecting section extracts and detects light within a range of a diameter less than $1.5\lambda/NA$ centered on an optical axis at the confocal position, the light being central light of the reflected light at the confocal position; and a phase difference imparting section, inserted on a light path from the light source to the photodetecting section, that imparts a designated phase difference between a reflected light component from a readout track and a reflected light component from a track neighboring the readout track from among tracks formed on the recording surface of the optical recording medium, wherein provided that a groove with a depth less than $\lambda/6$ is formed on the recording surface, and a recording mark sequence is formed on both the groove and a land disposed between the groove, and in addition, provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on only one of the outward path and the return path, wherein the phase difference imparting section is configured to be capable of varying a phase difference imparted between a reflected light component from the groove and a reflected light component from the land, and the phase difference imparting section is equipped with a controller that controls the phase difference imparting section in a manner that the phase difference imparted between the reflected light component from the groove and the reflected light component from the land is varied between when reading out the groove and when reading out the land.

11. A playback device comprising:

a light source;

an objective lens that radiates light emitted by the light source onto an optical recording medium, and onto which is incident reflected light obtained from a recording surface of the optical recording medium in accordance with the radiated light;

a condenser lens, onto which is incident the reflected light obtained via the objective lens, that condenses the reflected light;

a photodetecting section configured in a manner that, provided that a confocal position is a focal position of the condenser lens when the light emitted by the light source is focused onto the recording surface by the objective lens, $\lambda$ is a wavelength of light radiated onto the optical recording medium by the objective lens, and NA is a numerical aperture of the objective lens, the photodetecting section extracts and detects light within a range of a diameter less than $1.5\lambda/NA$ centered on an optical axis at the confocal position, the light being central light of the reflected light at the confocal position; and a phase difference imparting section, inserted on a light path from the light source to the photodetecting section, that imparts a designated phase difference between a reflected light component from a readout track and a reflected light component from a track neighboring the readout track from among tracks formed on the recording surface of the optical recording medium, wherein, in the optical recording medium, a recording mark sequence is formed in a concentric circular shape or a spiral shape on a same flat surface on the recording surface, and provided that an outward path is a light path from being emitted by the light source to being radiated onto the optical recording medium, and a return path is a light path from being reflected off the optical recording medium to being detected by the photodetecting section, the phase difference imparting section is inserted at a position that imparts a phase difference to light on both of the outward path and the return path.

* * * * *